United States Patent
Feigenbaum et al.

(10) Patent No.: US 12,266,370 B2
(45) Date of Patent: Apr. 1, 2025

(54) COMMUNICATIONS AND CONTENT PLATFORM

(71) Applicant: Prevail Legal, Inc., San Diego, CA (US)

(72) Inventors: Robert Feigenbaum, San Diego, CA (US); Random Bares, San Francisco, CA (US)

(73) Assignee: Prevail Legal, Inc., San Diego, CA (US)

( * ) Notice: Subject to any disclaimer, the term of this patent is extended or adjusted under 35 U.S.C. 154(b) by 0 days.

(21) Appl. No.: 18/605,696

(22) Filed: Mar. 14, 2024

(65) Prior Publication Data

US 2024/0249727 A1 Jul. 25, 2024

Related U.S. Application Data

(63) Continuation of application No. 18/317,848, filed on May 15, 2023.

(60) Provisional application No. 63/342,009, filed on May 13, 2022.

(51) Int. Cl.
G10L 17/06 (2013.01)
G10L 15/26 (2006.01)
H04L 65/1069 (2022.01)

(52) U.S. Cl.
CPC ............ *G10L 17/06* (2013.01); *G10L 15/26* (2013.01); *H04L 65/1069* (2013.01)

(58) Field of Classification Search
USPC ........................ 704/246, 247, 251, 252, 275
See application file for complete search history.

(56) References Cited

U.S. PATENT DOCUMENTS

| | | | | |
|---|---|---|---|---|
| 12,020,708 | B2* | 6/2024 | Bradley | G06F 40/284 |
| 2018/0204111 | A1* | 7/2018 | Zadeh | G06V 10/764 |
| 2020/0184278 | A1* | 6/2020 | Zadeh | G06N 3/044 |
| 2020/0242151 | A1* | 7/2020 | Adlersberg | G06F 16/483 |
| 2020/0243095 | A1* | 7/2020 | Adlersberg | G06F 40/216 |
| 2022/0115020 | A1* | 4/2022 | Bradley | G06F 40/134 |
| 2023/0113421 | A1* | 4/2023 | Kaleko | G06F 40/205 704/9 |
| 2023/0135071 | A1* | 5/2023 | Eden | G10L 15/183 704/235 |
| 2023/0260519 | A1* | 8/2023 | Medalion | G06V 20/46 704/232 |

* cited by examiner

*Primary Examiner* — Leonard Saint-Cyr
(74) *Attorney, Agent, or Firm* — Perkins Coie LLP

(57) ABSTRACT

A system and method that overcomes technological hurdles related to litigation-related management is disclosed. The technological hurdles were overcome with industry-transformative innovations in in-person, hybrid, and remote legal proceedings; court reporting; testimony management; trial preparation; and utilization of video evidence, to name several. These innovations resulted in many advantages, such as could-based testimony management, scalable digital transformation, dramatic savings in litigation costs, and fast turn-around on certified transcripts, to name several.

20 Claims, 2 Drawing Sheets

COMMUNICATIONS AND CONTENT PLATFORM

CROSS-REFERENCE TO RELATED APPLICATIONS

This application is a continuation of U.S. patent application Ser. No. 18/317,848, filed May 15, 2023, which claims the benefit of U.S. Provisional Patent Application No. 63/342,009, filed May 13, 2022. The content of the foregoing applications is incorporated herein in their entirety by reference.

BACKGROUND

For more than a century, depositions, hearing, and other legal proceedings have largely remained unchanged. It was seen as an impossible task due to the lack of technological tools available.

SUMMARY

The technological hurdles were overcome with industry-transformative innovations in in-person, hybrid, and remote legal proceedings; court reporting; testimony management; trial preparation; and utilization of video evidence, to name several. These innovations resulted in many advantages, such as could-based testimony management, scalable digital transformation, dramatic savings in litigation costs, and fast turn-around on certified transcripts, to name several.

DETAILED DESCRIPTION

Figure 1:
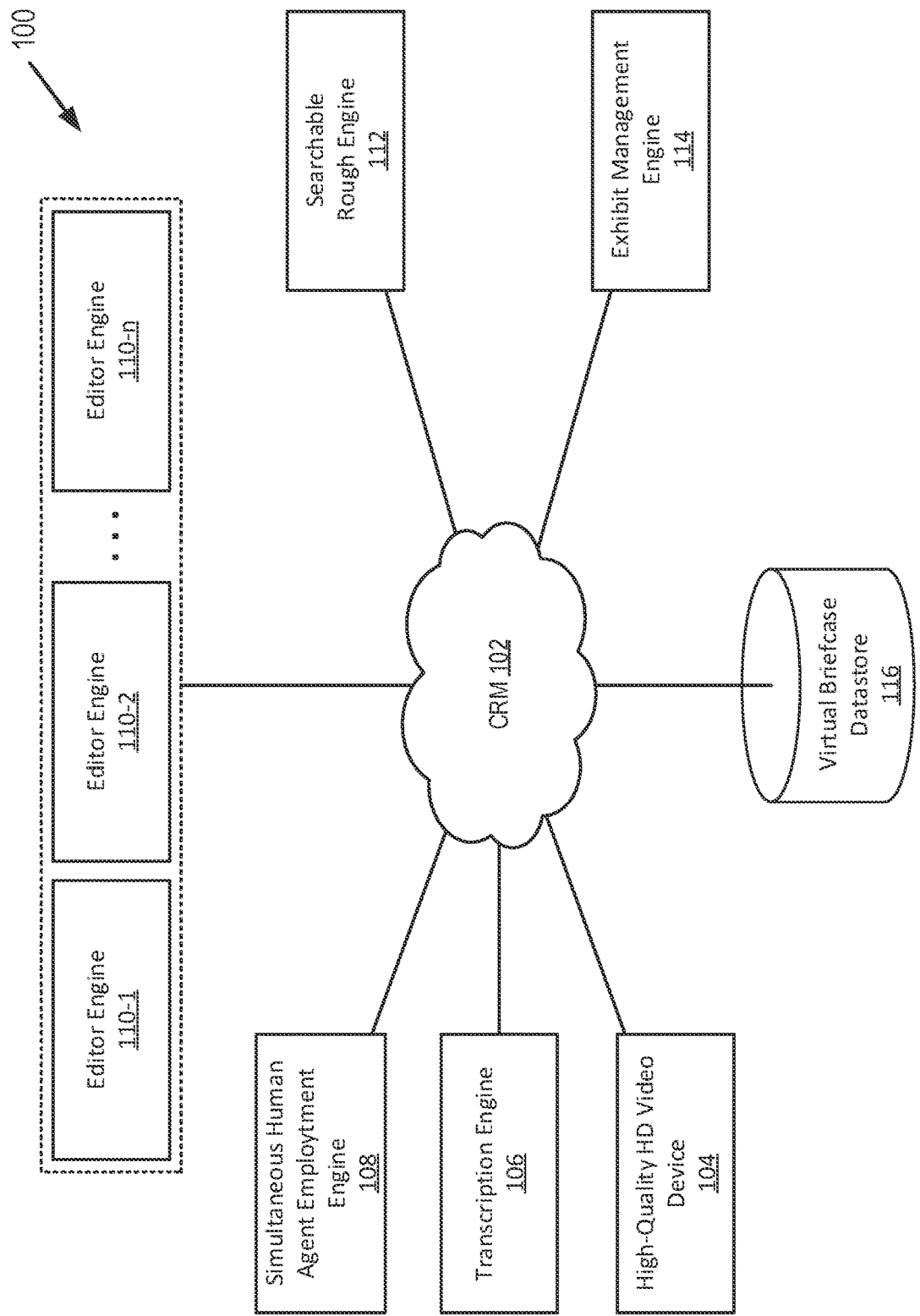
FIG. 1 depicts a diagram of an example of a system for virtual briefcase creation.

FIG. 1 depicts a diagram 100 of an example of a system for virtual briefcase creation. The diagram 100 includes a computer-readable medium (CRM) 102, a high-quality high definition (HD) video device 104 coupled to the CRM 102, a transcription engine 106 coupled to the CRM 102, a simultaneous human agent employment engine 108, an editor engine 110-1 to an editor engine 110-$n$ (individually or collectively, the "editor engine 110") coupled to the CRM 102, a searchable rough engine 112 coupled to the CRM 102, an exhibit management engine 114 coupled to the CRM 102, and a virtual briefcase datastore 116 coupled to the CRM 102. The system also includes a datastore of relevant data (not shown).

The CRM 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Where a first component is co-located on one device and a second component is located on a different device, the CRM 102 can include a wireless or wired back-end network or LAN. The CRM 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor that is a component of the engine. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations, while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the high-quality HD video device 104 provides crisp resolution, which translates to powerful presentation of evidence and better witness control. The high-quality HD video device 104 is assumed to include relevant drivers and network interfaces. In a specific implementation, sampling is performed at 48 kHz (AWS, for example, samples at 16 kHz and some recording devices sample at 8 kHz), but it is recognized that 96 kHz sampling could enable above 4.5× playback speeds. The high-quality HD video device 104 can include filters for removing noise, such as noise not in the human speech range, cable wire noise, microphone hissing, and the like. The filters can also be implemented as part of an environmental metadata engine (not shown) that considers characteristics of the speaking environment, such as microphone characteristics, reflections (e.g., from a monitor), imperceptible audio that could be played to physically map the environment, mouth movements (e.g., to facilitate AI lip reading), body movements (e.g., to facilitate AI body language interpretation), weather, and other detectable characteristics. Some or all the functionality of the environmental metadata engine can be considered as part of the transcription engine 106.

The transcription engine 106 includes an Artificial Intelligence (AI) speech capture technology to convert speech to text (in a "rough" that is a representation of spoken words). In a specific implementation, each speaker is identified and has a channel. Advantageously, by separating speakers into channels, each person can be segmented into chunks that can typically be edited separately faster than the audio lasts. For example, a first human agent can check text that is part of a rough for a first speaker while a second human agent checks text that is part of the rough for a second speaker. To further this example in a simplistic manner, if the first speaker and the second speaker provide 1 hour of audio each and are the only speakers, the first human agent and the second human agent can simultaneously check the relevant text of the rough in 1 hour or less (because faster playback and dead air skipping can reduce playback time). In a specific implementation, the transcription engine 106 is configured to flag lines of testimony in real time (e.g., as testimony unfolds), add editing tags or notes, create synchronized media clips, provide a confidence score (e.g., to automatically, or in accordance with human agent editor preferences or settings, introduce a slowdown during playback; this can also provide a likely rewind start location if the human agent clicks "hold up" or a similar playback command upon failing to recognize audio or when the human agent spots an error in the transcript), and the like. The transcription engine 108 can also include filters that make it easier for humans to pick out words; frequency, vibration, echo, and isolation are all potentially relevant. Some or all functionality of the transcription engine 106 can instead or in addition be considered part of an editing platform (represented by the dashed box around the editor engine 110).

The simultaneous human agent employment engine 108 identifies human agents ("transcriptionists") suitable for employment in association with a rough. Transcriptionists have core competencies that are either readily identifiable or that are only revealed (possibly without a convenient human word to describe the "competency") via machine learning. Core competencies can include fluency in a language, typing speed, error creation rate, redaction speed, and replay frequency, but other competencies can be identified by time of day, nature of testimony, environmental conditions, or the like, which may or may not become obvious until a human agent has performed one or more tasks. In a specific implementation, human agents are assigned tasks using, at least in part, word cloud density from a rough, compared to core competency for the human agent. Some or all functionality of the simultaneous human agent employment engine 108 can instead or in addition be considered part of an editing platform (represented by the dashed box around the editor engine 110).

The editor engine 110 is intended to be lightweight (relative to, e.g., AWS models), providing real-time or after-the-fact roughs. In a specific implementation, the editor engine 110 includes an editing platform (likely not a steno tool, as steno tools are poor tools for text) that scales as the simultaneous human agent employment engine 108 matches tasks to human agents, e.g., for each channel associated with the text of a rough (and segments of a channel can be provided to different human agents, as well). The editing platform is represented by the dashed box around the editor engine 110 in FIG. 1. Advantageously, the editor engine 110 enables faster playback, dead air skipping (reducing the length of audio or multimedia files), and slowdown for questionable words. Ideally, human editors never need to remove their hands from the keyboard as the editor engine 110 provides next data of an audio (or multimedia) file. In practice, using a transcription engine similar to the transcription engine 106, a simultaneous human agent employment engine similar to the simultaneous human agent employment engine 108, and an editor engine similar to the editor engine 110, the industry standard or 3 hours of human editing time for 1 hour of recording has been reduced to 30 minutes of human editing time for 1 hour of recording (e.g., with 2.5× playback and dead air skipping) when measured as weekly human ability efficiency.

The searchable rough engine 112 is configured to provide a fully searchable rough in real time (e.g., as deposition unfolds). In a specific implementation, the searchable rough engine 112 facilitates the combination of clips in any order to create a story, which can include closed captioning, watermarking, or the like, and requires nominal technical skill on the part of a human agent. Unsynchronized events can be identified as related, facilitating picking out sounds to synch together a play in tandem, correct for incorrect camera timestamps, unwatched audio, incorporation of environmental factors (e.g., time of day, angle of shot, etc.), and using an audio cue as a "clapper" or video, to name several. This functionality can instead or in addition be considered part of the exhibit management engine 114 (or the editing platform) and can be combined with a searchable augmented transcript engine (not shown) with tags and links that match portions of the augmented transcript to relevant portions of session recordings, roughs, and other data.

The exhibit management engine 114 is configured to upload, centralize, and organize exhibits, which are stored in the virtual briefcase datastore 116 for simple, reliable use. The virtual briefcase datastore 116 and other datastores described in this paper can have a corresponding engine to create, read, update, or delete (CRUD) data structures. While not shown in FIG. 1, these engines may or may not be described in association with other figures to illustrate relevant functionality.

Using the engines and datastores together, it becomes possible to search within and across depositions using Natural Language Processing (NLP), replay key clips from any deposition for which a user has access rights, create and play clips even from a current deposition to impeach a witness with his or her own testimony, create video-related stories and segments, and drive better case outcomes by weaponizing the testimony. It should be noted the system does not require multiple products and services for a single workflow. For example, trial exhibits can be created directly from the platform for storage in the virtual briefcase datastore 116. The system also eliminates the need for many services to create a certified verbatim transcript, such as videographer, real-time reporting, rough transcript, court reporter attendance, text synchronization, remote access for all participants, and word indexing, for which the functionality is either incorporated or obviated. In practice, the transcription editing system reduces time needed to transcribe an hour of audio from 3 hours to less than 30 minutes, making it 6 times faster than the industry standard.

Figure 2:
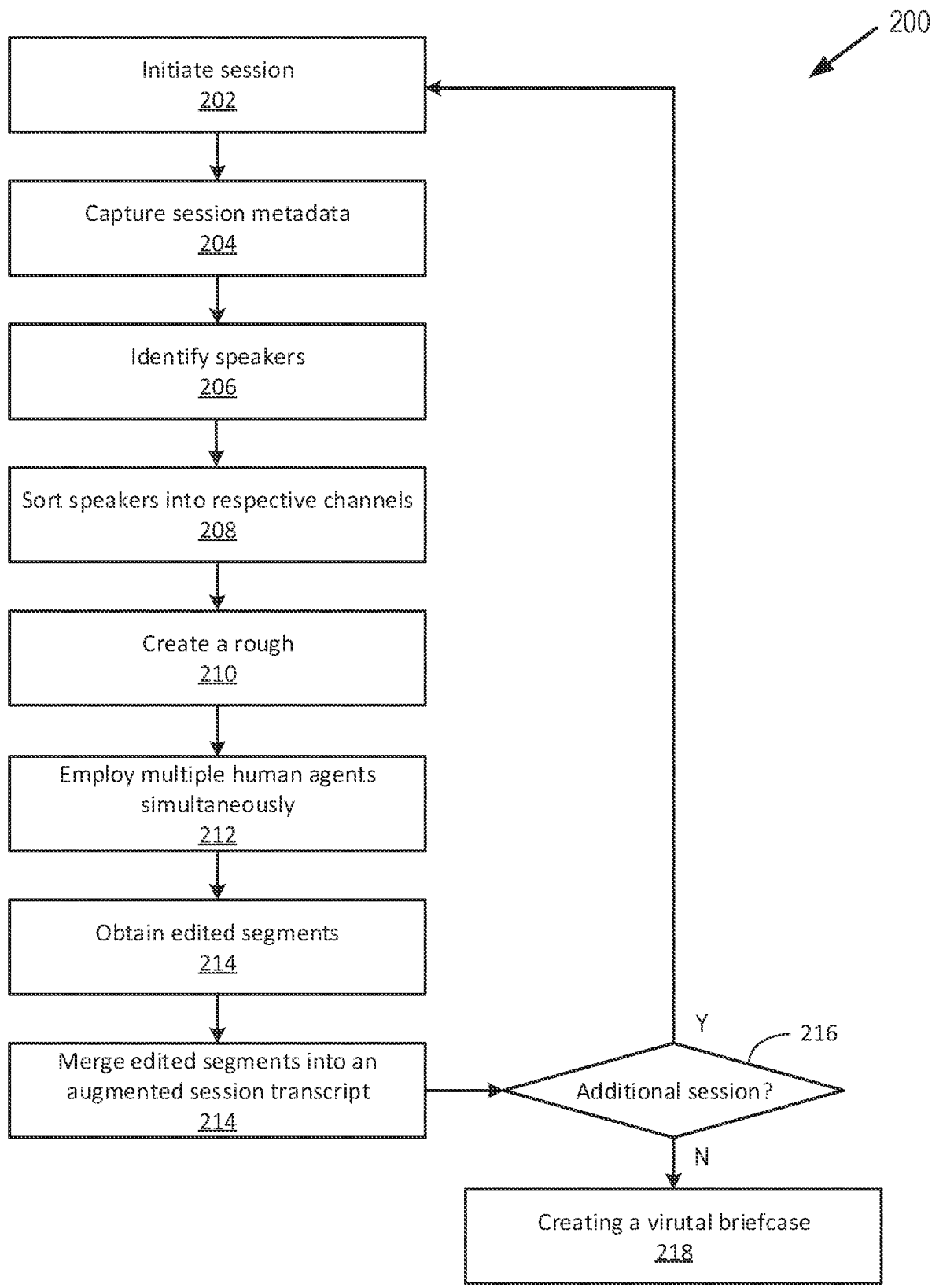
FIG. 2 depicts a flowchart of an example of a method for virtual briefcase creation.

FIG. 2 depicts a flowchart 200 of an example of a method for virtual briefcase creation. The flowchart 200 and potentially other flowcharts described in this paper include modules that can be reordered or organized to operate in parallel.

The flowchart 200 starts at module 202 with initiating a session. For the purposes of this example, a session is assumed to be a recording of one or more speakers, which can be characterized as "testimony" in certain legal contexts. It may be noted that other data, including recordings that do not include speech, files that require no transcription, and other data that is considered valuable as evidence or for other purposes can be stored and utilized for matching tasks to human agents, in the creation of a virtual briefcase, or the like but for illustrative purposes is not referred to as a "session" in this document (even if it has "session-like" characteristics). In a specific implementation, a high-quality HD video device such as the high-quality HD video device 104 is used to capture the session to achieve a desired sample rate, as described above.

The flowchart 200 continues to module 204 with capturing session metadata. It may be noted that session metadata may be derived from the environment prior to recording and/or from the recording itself. In a specific implementation, a transcription engine such as the transcription engine 106 is used to capture session metadata.

The flowchart 200 continues to module 206 with identifying speakers, to module 208 with sorting speakers into channels, and to module 210 with creating a rough. In some instances, all relevant speakers may be identified in advance of the session and in other instances one or more speakers may be introduced later during the session. Identifying a speaker does not necessarily mean the speaker is identified by anything other than characteristics of the speaker's voice, though in a typical legal context speakers will generally be identified by name and matched to their voices. In a specific implementation, a transcription engine such as the transcription engine 106 is used to sort speakers into channels and create a rough (and may or may not be used to identify speakers, which could be considered part of capturing session metadata).

The flowchart 200 continues to module 212 with employing multiple human agents simultaneously. The human agents are matched to a channel (or segment of a channel) and used simultaneously to complete transcription editing tasks in less time than the duration of the session; in a specific implementation, "less time" is a duration of ½ the duration of the session but "less time" can also mean ¼ and, as for a current implementation, ⅙ or, with high sample rates, ⅛. A simultaneous human agent employment engine such as the simultaneous human agent employment engine 108 is used to employ the multiple human agents simultaneously.

The flowchart 200 continues to module 214 with obtaining edited segments from the human agents and to module 216 with merging the edited segments into an augmented session transcript. An augmented session transcript can include data or links to data obtained outside of the session, but at least includes a complete transcript (in some contexts, an "official transcript") of the session, regardless of whether the complete transcript is stored in a time-sequenced file or a combination of timestamped files of various channels and/or metadata or subsets thereof. An editor engine such as the editor engine 110 is used to facilitate editing of segments of the rough by the human agents and an editing platform (represented by the dashed box around the editor engine 110 in FIG. 1) provides a platform at which the segments can be merged and further augmented.

The flowchart 200 continues to decision point 216 where it is determined whether there is an additional session to capture. If it is determined there is an additional session to capture (216-Y), then the flowchart 200 returns to module 202 and describes as described previously, but for the next session. If it is determined there are no additional sessions to capture (216-N), then the flowchart 200 continues to module 218 with creating a virtual briefcase. An exhibit management engine such as the exhibit management engine 114 can be used to create the virtual briefcase. A virtual briefcase datastore such as the virtual briefcase datastore 116 represents the data contained within the virtual briefcase regardless of where or how the data is stored.

Although the flowchart 200 illustrates a flow that captures all sessions prior to creating the virtual briefcase for illustrative purposes, in an expected implementation the virtual briefcase can be edited as data becomes available or as updates or deletions are deemed desirable; there is generally no need to capture all sessions that are ultimately incorporated into the virtual briefcase when it is initially created.

What is claimed is:

1. A method performed by one or more computing systems for augmenting session transcripts, the method comprising:
receiving session data comprising a set of audiovisual recording data;
receiving session metadata comprising: data derived from an environment in which the set of audiovisual recording data was captured, or data associated with the set of audiovisual recording data, or both;
parsing the session data and the session metadata to identify a set of speakers;
identifying a set of channels, wherein each channel in the set of channels corresponds to a speaker in the set of speakers;

applying a machine learning speech model to generate a rough transcript corresponding to the set of audiovisual recording data,
    wherein each segment of the rough transcript corresponds to a speaker from the set of speakers and a channel from the set of channels;
for each channel in the set of channels:
    identifying a set of segments of the rough transcript associated with the channel;
    mapping the channel to a particular verification agent within a set of verification agents using one or more competencies of the particular verification agent,
        wherein the particular verification agent mapped to each channel in the set of channels is different, and
        wherein the particular verification agent is configured to edit the set of segments of the rough transcript associated with the mapped channel;
    transmitting the identified set of segments to the particular verification agent; and
    receiving an edited version of the identified set of segments from the particular verification agent; and
generating an augmented session transcript by merging the edited versions of the set of segments received for each channel in the set of channels.

2. The method of claim 1, wherein the set of audiovisual recording data is captured via a high-quality HD video device.

3. The method of claim 1, wherein the set of audiovisual recording data is captured at a specific sample rate.

4. The method of claim 1 further comprising: updating a virtual repository to include the generated augmented session transcript.

5. The method of claim 1, wherein each speaker from the set of speakers is assigned a unique channel from the set of channels.

6. The method of claim 1 further comprising: flagging one or more portions of the rough transcript in real-time for further review.

7. The method of claim 1 further comprising: adding editing tags or notes to one or more portions of the rough transcript.

8. The method of claim 1 further comprising: generating a confidence score to one or more portions of the rough transcript.

9. The method of claim 1,
    wherein the one or more competencies comprise one or more of the following: fluency in a language, typing speed, error creation rate, redaction speed, or replay frequency.

10. The method of claim 1,
    wherein the one or more competencies are identified based on one or more of: time of day when the set of audiovisual recording data was captured, nature of testimony captured in the set of audiovisual recording data, or environmental conditions of the environment in which the set of audiovisual recording data was captured.

11. At least one non-transitory, computer-readable medium carrying instructions, which when executed by at least one data processor, performs operations for augmenting session transcripts, the operations comprising:
    receiving session data comprising a set of audiovisual recording data;
    receiving session metadata comprising: data derived from an environment in which the set of audiovisual recording data was captured, or data associated with the set of audiovisual recording data, or both;
    parsing the session data and the session metadata to identify a set of speakers;
    identifying a set of channels, wherein each channel in the set of channels corresponds to a speaker in the set of speakers;
    applying a machine learning speech model to generate a rough transcript corresponding to the set of audiovisual recording data,
        wherein each segment of the rough transcript corresponds to a speaker from the set of speakers and a channel from the set of channels;
    for each channel in the set of channels:
        identifying a unique set of segments of the rough transcript associated with the channel;
        mapping the channel to a particular verification agent within a plurality of verification agents,
            wherein the particular verification agent mapped to each channel in the set of channels is different, and
            wherein each mapped verification agent within the plurality of verification agents is configured to edit a corresponding set of segments of a corresponding mapped channel in parallel with other mapped verification agents within the plurality of verification agents;
        transmitting the identified set of segments to the particular verification agent; and
        receiving an edited version of the identified set of segments from the particular verification agent; and
    generating an augmented session transcript by merging the edited versions of the set of segments received for each channel in the set of channels.

12. The at least one non-transitory, computer-readable medium of claim 11, wherein the set of audiovisual recording data is captured via a high-quality HD video device.

13. The at least one non-transitory, computer-readable medium of claim 11, wherein each speaker from the set of speakers is assigned a unique channel from the set of channels.

14. The at least one non-transitory, computer-readable medium of claim 11, wherein the mapping the channel to the particular verification agent within the plurality of verification agents is based on one or more competencies of the particular verification agent,
    wherein the one or more competencies comprise one or more of the following: fluency in a language, typing speed, error creation rate, redaction speed, or replay frequency.

15. The at least one non-transitory, computer-readable medium of claim 14,
    wherein the one or more competencies are identified based on one or more of: time of day when the set of audiovisual recording data was captured, nature of testimony captured in the set of audiovisual recording data, or environmental conditions of the environment in which the set of audiovisual recording data was captured.

16. A system for augmenting session transcripts, the system comprising:
    at least one hardware processor; and
    at least one non-transitory memory, coupled to the at least one hardware processor and storing instructions, which when executed by the at least one hardware processor, perform a process, the process comprising:
        receiving session data comprising a set of audiovisual recording data;
        receiving session metadata comprising: data derived from an environment in which the set of audiovisual recording data was captured, or data associated with the set of audiovisual recording data, or both;

parsing the session data and the session metadata to identify a set of speakers;

identifying a set of channels, wherein each channel in the set of channels corresponds to a speaker in the set of speakers;

applying a machine learning speech model to generate a rough transcript corresponding to the set of audiovisual recording data, wherein each segment of the rough transcript corresponds to a speaker from the set of speakers and a channel from the set of channels;

for each channel in the set of channels:

identifying a set of segments of the rough transcript associated with the channel;

mapping the channel to a particular verification agent within a set of verification agents using one or more competencies of the particular verification agent, wherein the particular verification agent mapped to each channel in the set of channels is different, and wherein the one or more competencies are determined by applying an artificial intelligence model on a set of previous performances of the verification agent;

transmitting the identified set of segments to the particular verification agent; and receiving an edited version of the identified set of segments from the particular verification agent; and generating an augmented session transcript by merging the edited versions of the set of segments received for each channel in the set of channels.

17. The system of claim 16, wherein each speaker from the set of speakers is assigned a unique channel from the set of channels.

18. The system of claim 16, wherein the one or more competencies comprise one or more of the following: fluency in a language, typing speed, error creation rate, redaction speed, or replay frequency.

19. The system of claim 16, wherein the one or more competencies are determined using one or more of: time of day when the set of audiovisual recording data was captured, nature of testimony captured in the set of audiovisual recording data, or environmental conditions of the environment in which the set of audiovisual recording data was captured.

20. The system of claim 16, wherein the core competencies are determined by comparing a word cloud density from the rough transcript to the one or more competencies of the particular verification agent.

* * * * *